United States Patent
Ragland et al.

(10) Patent No.: US 6,276,356 B1
(45) Date of Patent: Aug. 21, 2001

(54) PORTABLE GAS GRILL

(75) Inventors: Scott W. Ragland, Alpharetta; J. Bradley Pearce, Snellville; Matthew S. Remke, Atlanta; Danny L. Constable, Lawrenceville, all of GA (US)

(73) Assignee: ATD Corporation, Norcross, GA (US)

( * ) Notice: Subject to any disclaimer, the term of this patent is extended or adjusted under 35 U.S.C. 154(b) by 0 days.

(21) Appl. No.: 09/350,798

(22) Filed: Jul. 9, 1999

Related U.S. Application Data

(60) Provisional application No. 60/092,321, filed on Jul. 9, 1998.

(51) Int. Cl.[7] .................................................. A47J 37/00
(52) U.S. Cl. .................... 126/41 R; 126/38; 126/39 J; 126/50
(58) Field of Search ..................... 126/41 R, 38, 126/39 R, 9 R, 39 J, 9 A, 9 B, 25 R, 40, 50, 305, 92 R; 431/8, 328; 99/446

(56) References Cited

U.S. PATENT DOCUMENTS

| | | |
|---|---|---|
| 1,051,503 | 1/1913 | Klein . |
| 1,815,570 | 7/1931 | Jones . |
| 1,910,703 | 5/1933 | Le Grand . |
| 1,934,174 | 11/1933 | Dyckerhoff . |
| 1,974,665 | 9/1934 | Schnetzer et al. . |
| 1,987,798 | 1/1935 | Ruppricht . |
| 2,010,180 | 8/1935 | De Ferranti . |
| 2,045,733 | 6/1936 | Spafford . |
| 2,110,660 | 3/1938 | Doczekal . |
| 2,170,937 | 8/1939 | Brüning . |
| 2,180,373 | 11/1939 | Siblley et al. . |
| 2,212,481 | 8/1940 | Sendzimir . |
| 2,312,987 | 3/1943 | Grassaick . |
| 2,441,476 | 5/1948 | Ewald . |
| 2,466,859 | 4/1949 | Northrup . |
| 2,481,046 | 9/1949 | Scurlock . |
| 2,512,875 | 6/1950 | Reynolds . |
| 2,668,692 | 2/1954 | Hammell . |
| 2,783,358 | 2/1957 | Wolf . |
| 2,861,562 | * 11/1958 | Ross et al. ............................ 126/38 |
| 2,926,761 | 3/1960 | Herbert, Jr. . |
| 2,962,811 | 12/1960 | Herbert, Jr. . |
| 2,963,128 | 12/1960 | Rapp . |
| 2,967,225 | 1/1961 | Carrier, Jr. et al. . |
| 3,029,910 | 4/1962 | Kirk et al. . |
| 3,152,033 | 10/1964 | Black et al. . |
| 3,175,958 | 3/1965 | Bourgade . |
| 3,190,412 | 6/1965 | Rutter et al. . |
| 3,244,224 | 4/1966 | Hnilicka, Jr. . |
| 3,354,021 | 11/1967 | Royet . |
| 3,387,333 | 6/1968 | Irvine et al. . |
| 3,424,145 | 1/1969 | Stitt . |
| 3,509,990 | 5/1970 | Piazze . |
| 3,527,154 | 9/1970 | Shaper et al. . |
| 3,629,549 | 12/1971 | Svendsen . |

(List continued on next page.)

FOREIGN PATENT DOCUMENTS

| | | |
|---|---|---|
| 2169265 | 2/1995 | (CA) . |
| 684383 | 12/1978 | (CH) . |
| 26 12 380 | 9/1977 | (DE) . |

(List continued on next page.)

*Primary Examiner*—James C. Yeung
(74) *Attorney, Agent, or Firm*—Burns, Donae, Swecker & Mathis, LLP

(57) ABSTRACT

A portable gas grill features a combination of quick heat up and quick cool down in a compact and truly portable self contained grill for camping, tailgating, and other activities. The gill includes a lower housing containing a multilayer metal foil insulation/reflector member, a grill surface, a radiant heating element, and a grill cover with a multilayer metal foil insulating/reflector member. The radiant heating element utilized in the gas grill includes a gas jet burner in combination with a heat radiating tube which contains the flame extending from the jet burner. The radiant heat generated by the radiant heating tube heats a grill surface of 170 square in. or greater to adequate grilling temperatures such as 700° F. and higher.

22 Claims, 3 Drawing Sheets

U.S. PATENT DOCUMENTS

| | | |
|---|---|---|
| 3,712,285 | 1/1973 | Copeland . |
| 3,732,803 | 5/1973 | Buxman . |
| 3,801,419 | 4/1974 | Meek . |
| 3,958,714 | 5/1976 | Barriere et al. . |
| 3,959,620 | 5/1976 | Stephen, Jr. . |
| 3,966,646 | 6/1976 | Noakes et al. . |
| 3,981,689 | 9/1976 | Trelease . |
| 4,025,996 | 5/1977 | Saveker . |
| 4,034,663 | 7/1977 | Jenn et al. . |
| 4,037,751 | 7/1977 | Miller et al. . |
| 4,074,495 | 2/1978 | Bodnar . |
| 4,099,928 | 7/1978 | Norback . |
| 4,251,598 | 2/1981 | Waite . |
| 4,318,965 | 3/1982 | Blair . |
| 4,337,565 | 7/1982 | Diana . |
| 4,343,866 | 8/1982 | Oser et al. . |
| 4,344,591 | 8/1982 | Jackson . |
| 4,386,128 | 5/1983 | Yoshikawa . |
| 4,394,410 | 7/1983 | Oarow et al. . |
| 4,418,678 | 12/1983 | Erickson . |
| 4,425,497 | 1/1984 | Leary et al. . |
| 4,430,553 | 2/1984 | Antimovski . |
| 4,434,781 | 3/1984 | Koziol . |
| 4,535,753 | 8/1985 | Zavauskas . |
| 4,559,205 | 12/1985 | Hood . |
| 4,576,800 | 3/1986 | Retallick . |
| 4,663,517 | 5/1987 | Huff et al. . |
| 4,683,867 | 8/1987 | Beatty . |
| 4,687,697 | 8/1987 | Cambo et al. . |
| 4,703,159 | 10/1987 | Blair . |
| 4,759,964 | 7/1988 | Fischer et al. . |
| 4,794,052 | 12/1988 | Morrison . |
| 4,810,588 | 3/1989 | Bullock et al. . |
| 4,878,477 * | 11/1989 | McLane .............................. 126/41 R |
| 4,954,676 | 9/1990 | Rankin . |
| 4,971,216 | 11/1990 | Fortune . |
| 5,011,743 | 4/1991 | Sheridan et al. . |
| 5,015,824 | 5/1991 | Monter et al. . |
| 5,029,721 | 7/1991 | Timpe . |
| 5,030,302 | 7/1991 | Jud et al. . |
| 5,156,140 | 10/1992 | Zisman . |
| 5,158,814 | 10/1992 | Foti . |
| 5,176,067 | 1/1993 | Higgins . |
| 5,196,253 | 3/1993 | Mueller et al. . |
| 5,197,379 | 3/1993 | Leonard, Jr. . |
| 5,347,978 * | 9/1994 | Zuran ................................. 126/41 R |
| 5,385,790 | 1/1995 | Atkinson et al. . |
| 5,406,930 | 4/1995 | Ragland et al. . |
| 5,408,071 | 4/1995 | Ragland et al. . |
| 5,424,139 | 6/1995 | Shuler et al. . |
| 5,503,062 | 4/1996 | Buff, IV . |
| 5,524,406 | 6/1996 | Ragland . |
| 5,546,853 * | 8/1996 | Heil et al. ................................ 431/8 |
| 5,582,094 | 12/1996 | Peterson et al. . |
| 5,582,389 | 12/1996 | Greene . |
| 5,633,064 | 5/1997 | Ragland et al. . |
| 5,670,264 | 9/1997 | Sheridan . |
| 5,763,857 | 6/1998 | Klement et al. . |
| 5,958,603 | 9/1999 | Ragland et al. . |

FOREIGN PATENT DOCUMENTS

| | | |
|---|---|---|
| 0 132 364 | 7/1984 | (EP) . |
| 80 26242 | 12/1980 | (FR) . |
| 2666717 | 9/1990 | (FR) . |
| 126780 | 5/1919 | (GB) . |
| 471175 | 8/1937 | (GB) . |
| 737331 | 9/1955 | (GB) . |
| 783184 | 9/1957 | (GB) . |
| 971185 * | 9/1964 | (GB) ...................................... 126/38 |
| 1403861 | 8/1975 | (GB) . |
| 2 143 633 | 2/1985 | (GB) . |
| 41 36 088 | 11/1990 | (GB) . |
| 1972-2049 | 12/1971 | (JP) . |
| 1973-00209 | 6/1973 | (JP) . |
| 62-37518 | 3/1987 | (JP) . |
| WO 95/04901 | 2/1995 | (WO) . |
| 95/06742 | 4/1998 | (WO) . |

\* cited by examiner

PORTABLE GAS GRILL

This application claims priority of U.S. Provisional Application Ser. No. 60/092,321 filed on Jul. 9, 1998 which is incorporated herein by reference in its entirety.

FIELD OF THE INVENTION

This invention relates to gas grills which are portable in nature due to having a source of bottled gas, usually propane, connected to the grill to provide portability. Portable gas grills range from large models on wheels containing a 25 pound propane bottle to table top portable gas grills utilizing a one pound propane bottle or canister.

BACKGROUND OF THE INVENTION

Portable gas grills available in the market utilize conventional burner arrangements for cooking food primarily by convection heating. In larger grills having a large container of gas such as propane, sufficient cooking temperatures are usually reached and the proper upright position of the gas bottle is usually acceptable; however, in the small portable gas grill area, particularly table top type models, cooking temperatures are frequently inadequate and the small propane gas bottle or canister is frequently connected or positioned in an undesirable manner. For example, in some grills, the gas canister is supported largely by the connector itself which poses a potential of breaking the connector tubing during use. In other instances, the gas bottle must be laid substantially horizontally in order to achieve the connection with the grill-burner system which poses the potential of liquid propane entering the burner system.

It is desirable to have an improved portable gas grill having improved cooking temperatures and having improved positioning for the propane canister.

SUMMARY OF THE INVENTION

In one aspect, this invention provides a gas grill containing a radiant heating element comprising a jet gas burner in combination with a radiant heating tube element adapted for containing the flame from the jet burner within the tube and for heating to very high temperatures from the flame and radiating heat within the grill for desired cooking of food. The radiant heating tube can be open or closed at the end distal from the jet burner and can have appropriate openings along the length of the tube for exit of combustion gases. Preferably the tube is closed at the distal end and the openings are on the bottom of the tube to thereby provide maximum heating of the tube by the flame from the burner and thereby provide maximum radiant heating within the grill.

In another aspect, this invention provides a gas grill with the above radiant heating element in combination with a multi layer metal foil insulation/reflector element in the top and/or bottom portion of the grill adapted for reflecting the radiant heat from the radiant heating element toward the grill surface and the food on the grill surface and for insulating the grill housing to provide lower exterior surface temperatures of the grill housing. Preferably, the multi layer metal foil insulation/reflector elements provide sufficient reflectivity to enable the grill to operate with a single radiant gas heating element and sufficiently insulative to enable the use of a molded plastic housing including both the bottom portion of the grill housing and the top or lid portion of the grill housing. In a preferred aspect of this invention, the radiant heating element and the insulation/reflector elements provide a grill cooking temperature of at least 700° F. while providing a housing exterior surface temperature of less than about 300° F.

In another aspect of this invention a table top type gas grill is provided having a housing adapted to enclose a propane bottle or canister while it is connected to the burner of the grill to protect the bottle from outside impact during use, to separate the bottle from and insulate the bottle from the heat produced in the grill during use and to enable the use of the bottle in the desired upright position.

Another aspect this invention provides a lightweight portable gas grill capable of quick heat up and quick cool down for camping, tailgate, patio, or other outdoor table top use, which contains a removable grease dripping trap that can be removed and emptied without moving the grill, or can remain in the grill without being emptied during ordinary transport of the grill by hand or by vehicle without spilling the contents of the grease trap.

Another aspect of this invention provides a portable gas grill having a rigid cover adapted to fit over the entire grill, attached to the grill and serve as a carrying case for the grill. The cover can preferably be adapted to be removed from the grill, placed on the ground or patio and the grill placed on top of the cover to elevate the grill to a more comfortable height for use when a table or tailgate is not conveniently available.

In accordance with another aspect of the invention, a portable gas grill includes a grill housing including a base and a cover. A grilling surface is positioned within the housing and a radiant heating element is included within the grill housing for heating food on the grilling surface by radiant heating. The radiant heating element includes a gas jet and a multilayer metal insulation and reflector element within the grill housing for reflecting radiant heat from the radiant heating element to the grilling surface.

In accordance with a further aspect of the invention, a cooking device includes a cooking surface, a radiant heating tube for delivering radiant heat to the cooking surface, and a gas burner positioned to generate a flame which is substantially contained within the radiant heating tube.

In accordance with another aspect of the invention, a portable gas grill includes a grill housing including a base and a cover, a grilling surface which is positioned within the housing, a gas heating element within the grill housing for heating food on the grilling surface, and a gas canister chamber within the grill housing configured to receive and completely contain a gas canister in an upright orientation.

DETAILED DESCRIPTION OF THE PREFERRED EMBODIMENT

The portable gas grill of this invention provides true portability with the convenience of a self-contained gas cannister and a self-contained grease drippings trap. These features in combination with the quick heat up and quick cool down aspects of the gas grill of this invention also provide a convenience desired for camping, tailgate parties, and the like. The gas grill of this invention provides true grilling at high temperatures such as 700° F. and higher without the inconvenience or contamination involved with charcoal grills and without the inconvenience of connecting and disconnecting the gas cannister at each use.

Figure 1:
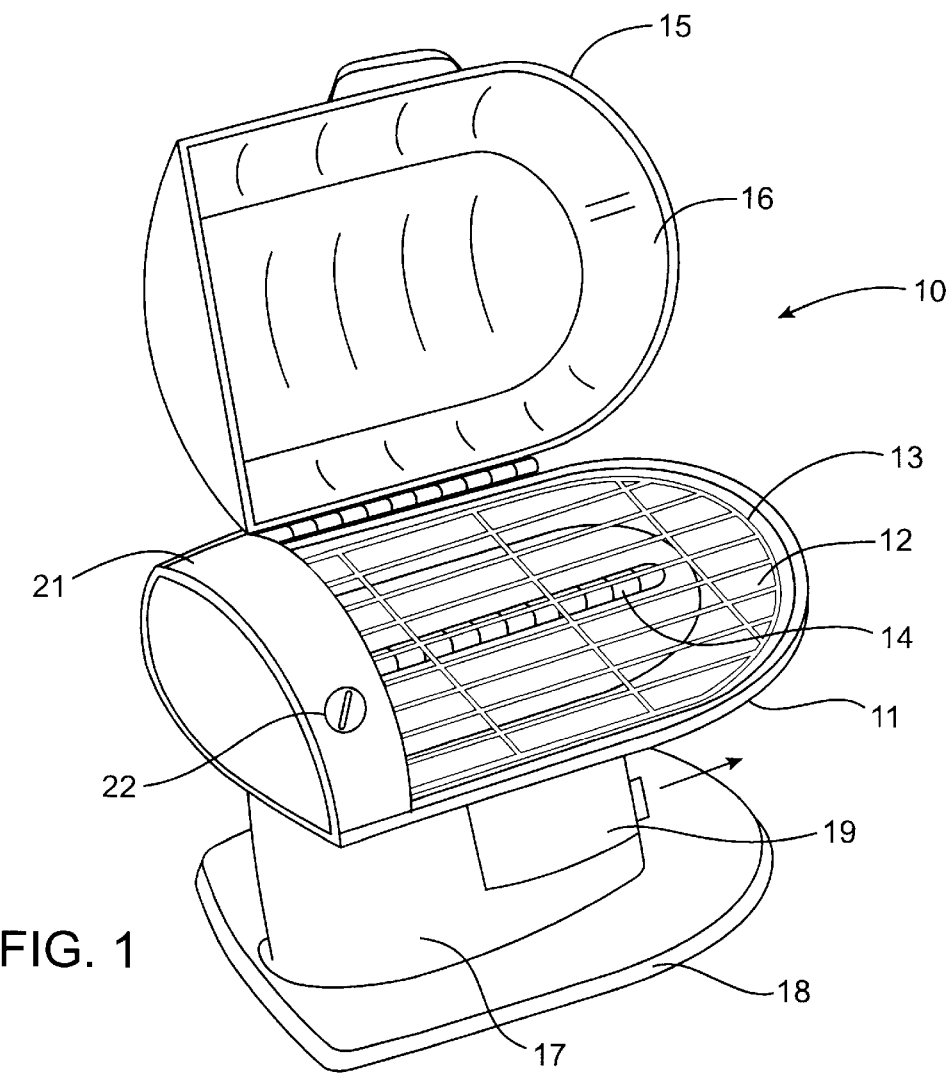
FIG. 1 is a perspective view of a preferred design of grill of this invention.

It will be recognized that the elements and combinations of elements of this invention are primarily preferred for small portable gas grills such as tabletop models, but various elements of this invention can be adapted and utilized to certain advantage in larger portable gas grills as well. The design of this invention is illustrated in FIG. 1 wherein the grill 10 includes a lower housing 11 containing a multi layer metal foil insulation/reflector member 12, a grill surface 13, and two radiant heating elements 14. The upper portion of the grill housing is preferably in the form of a hinged lid 15 which contains a similar multi layer metal foil insulating/reflector member 16. The lower portion of the housing 11 is supported on a pedestal 17 and a base 18. The pedestal 17 is adapted on one side to contain an upright gas bottle or cannister and on the other side a removable grease dripping trap 19. Above the portion of the pedestal 17 containing the gas bottle cannister, an upper portion 21 of the housing is hinged or otherwise removable to open and provide access to and removal and replacement of the gas bottle or cannister in the pedestal 17. An on/off control for the gas can be accessed by raising the cover 21 or in a preferred aspect can be operated with an external control knob 22 connected to the gas valve on the gas canister. The grill surface 13 preferably has a grill surface area of about 170 square in. or greater, more preferably about 170 to about 200 square in.

Figure 2:
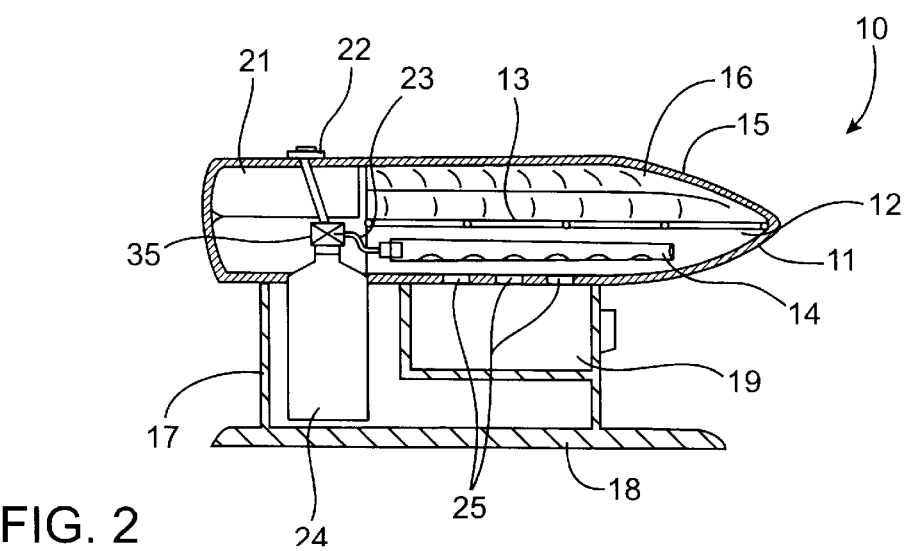
FIG. 2 is a cross-sectional side view of the gas grill of FIG. 1 showing the position of the internal parts.

FIG. 2 is a side cross-sectional view of the gas grill 10 of FIG. 1 wherein the radiant heating element 14 is connected to a gas canister 24 by a connector 23 and a valve 35. As can be seen, the upper cover portion 21 can be lifted if hinged or removed if it is not permanently attached in order to service or remove and replace the gas bottle or cannister 24.

FIG. 2 also illustrates the bottom portion of the housing 11 and the bottom insulating/reflecting member 12 containing at least one opening 25 positioned to communicate with the grease dripping trap 19. The grease dripping trap 19 can be removed for emptying without moving the grill. In addition, the trap 19 can remain in place during normal transport of the portable gas grill 10 without being emptied and without significant likelihood that the contents of the grease dripping trap will spill out of the trap. If desired the grease dripping trap 19 can be made disposable so that it can be removed and disposed of when desired and replaced with a new grease trap, thus eliminating the need for any cleaning of the grease dripping trap 19.

Figure 3:
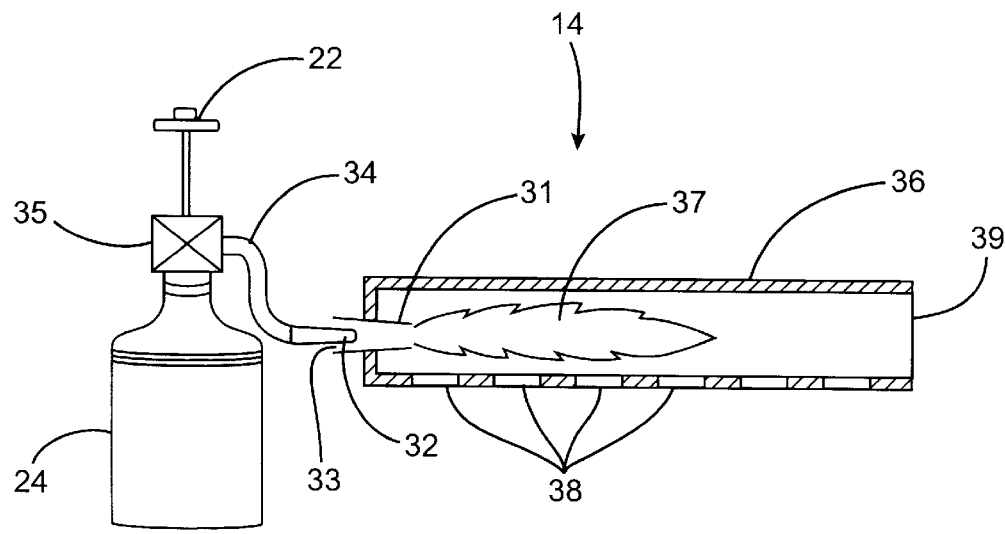
FIG. 3 is a schematic diagram of the radiant heating element and jet burner.
Figure 3A:
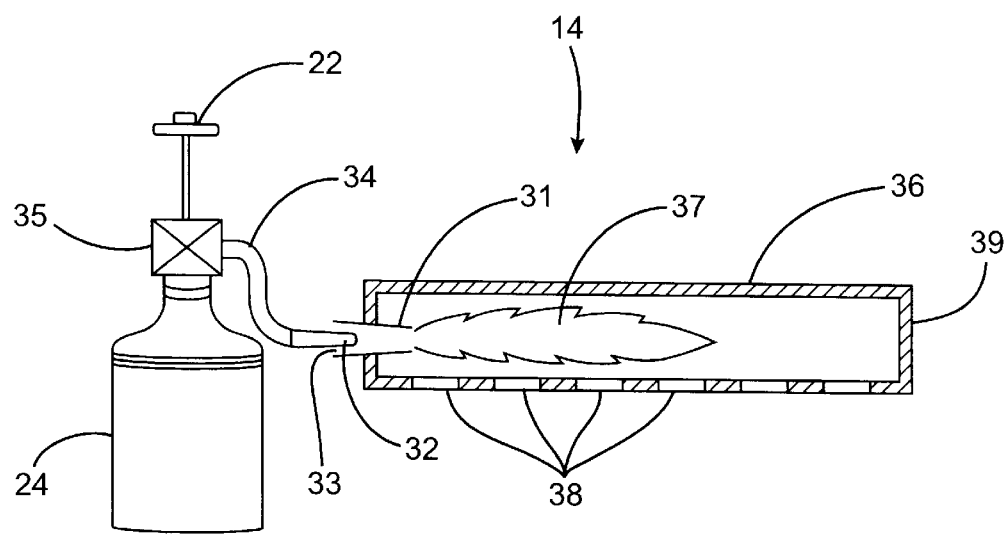
FIG. 3a is a schematic diagram of an alternative embodiment of a radiant heating element and jet burner.

FIG. 3 illustrates the radiant heating element 14 utilized in the gas grill according to this invention. The heating element 14 includes a conventional gas jet burner 31 having a gas inlet jet 32 and a combustion air inlet 33 surrounding the gas jet inlet. The gas jet inlet 32 is connected by the connector 34 to the gas control valve 35 and the gas cannister 24. The jet burner 31 utilized in the heater of this invention can be essentially the same or similar to the propane torch burner used on a plumber's torch or soldering torch or similar gas jet burners. The radiant heating element 14 of this invention comprises such a gas jet burner 31 in combination with a heat radiating tube 36 which is adapted to have sufficient length and diameter to contain the entirety of the flame 37 extending from the jet burner 31. A distal end 39 of the radiant heating tube 36 can either be opened as shown in FIG. 3 or closed as shown in FIG. 3a depending on the desired design that is most efficient to maximize the temperature of heat radiating tube 36 as heated by the flame 37. In one preferred embodiment, the distal end 39 is closed and a plurality of openings 38 are provided in the bottom of the tube to maximize the temperature of the tube 36 and to provide a more even and wide distribution of the exhaust gas heat from the flame 37. The openings 38 and radiant heating tube 36 can be of any desired configuration, including for example a continuous slit, round holes, or a plurality of slits either longitudinally, angled, or transverse. Similarly, the tube 36 can be of any desired shape such as a cylindrical tube, square tube, triangular tube, or other configuration which provides the radiant heating properties desired for operation of the portable gas grill according the present invention.

In the portable gas grill 10 of this invention it is preferred that the radiant heating tube 36 be heated to the maximum temperature by the flame 37 in order to achieve the maximum proportion of heating by radiant heating within the grill interior. In addition, the openings 38 are distributed to achieve the maximum distribution of convection heating within the grill interior. As will be apparent to one skilled in the art, the radiant heating tube 36 and the jet burner 31 can be designed and configured to maximize the amount of radiant heat compared to the amount of convection heating. The radiant heat from the radiant heating tube 36, sometimes called an emitter, should account for at least 30% and preferably more than 70% of the total heat produced within the grill interior with the remainder of the heat provided by convection heating.

The radiant heating tube 36 can be constructed of material selected by one skilled in the art with sufficient durability and the ability to withstand the high temperatures of the grill environment. One preferred material is stainless steel which is sufficiently durability while withstanding the high temperatures produced by flame 37. Other materials may be used depending on the temperature, configuration, and other properties desired. It will also be recognized that due to the high temperature exposure of the radiant heating tube 36, which is typically above 1000° F., the tube 36 will also act as a flavor enhancer within the grill due to the vaporization of grease and other drippings which fall onto the tube 36 from the food being cooked on the grill surface 13. As will also be recognized by one skilled in the art, multiple radiant heating tubes with multiple jet burners can be employed in the gas grill according to the present invention. However, for a small table top portable gas grill, a single tube and single jet burner is preferred for simplicity of operation. The valve 35 can be a conventional on/off or variable volume valve depending on the design desired. Ignition of the jet burner can be by any conventional means, such as a match, lighter, piezoelectric push-button igniter, or other self ignition.

The radiant heating element 14 as described above, including the jet burner 31 and the radiant heating tube 36 can be employed in a conventional portable gas grill housing, which preferably will contain a reflector element on the interior of the grill housing in order to take advantage of the radiant heat produced by the radiant heating tube 36. While it may be possible to obtain grilling temperatures of 700° F. or above in a conventional steel or porcelain-coated steel grill housing by using larger radiant heating elements 14 or multiple heating elements 14, it is preferred that the grill housing contain an appropriate insulating/reflector liner or insert to maximize the utilization of the radiant heat produced by radiant heating element 36. The more efficient the insulation/reflector elements 12, 16, the higher the grilling temperature will be on the interior of the grill for a given jet burner size and the endurance or cooking time on a given container of gas or propane will be increased.

In a preferred embodiment of this invention, the insulation/reflector elements and liners 12, 16 comprise multi layer metal foil elements, preferably aluminum. The multi layer metal foil structure are embossed, corrugated, or otherwise provided with spacers to provide gaps between the individual metal foil layers. The interior layer of the insulation/reflector element 12, 16, i.e., the layer facing the food and the heating element may be thicker than a metal foil for durability and rigidity purposes. Typically the metal foil layers will be 6 mils or less but the inner layer can be a thicker sheet having a thickness such as 10, 20 or 30 mils. It has been found that the multi layer metal foil construction provides the maximized reflection of the radiant heat produced by radiant heater 14, thereby maximizing the temperature reached at the surface of the grill for cooking the food. The multi layer metal insulation/reflector elements 12, 16 can also be made of heavier gauge metal than foils, i.e., each of the layers of the multi layer metal construction can be thicker than 6 mils. The particular construction and configuration of the multi layer metal elements can be selected and designed by one skilled in the art, utilizing the information provided in the present invention disclosure. For example, various combinations of thicknesses of layers of foils and metal sheets can be used in various numbers and in various combinations of embossments, corrugations, and other shapes. Such multi layer metal foil and multi layer metal sheet constructions suitable for use as insulation/reflector elements 12, 16 in the present invention can be those disclosed in or adapted from those disclosed in co-pending applications U.S. Ser. No. 08/871,771, filed Jun. 9, 1997; U.S. Ser. No. 09/001,372, filed Dec. 31, 1997; and U.S. Ser. No. 09/092,631, filed Jun. 5, 1998, the disclosures of which are incorporated herein by reference.

The preferred multi layer metal foil and metal sheet insulation members 12, 16 are capable of providing interior grill temperatures in excess of 700° F. for the desired searing and cooking grill temperatures while maintaining the external housing of the grill 10 below about 300° F. or 350° F. Such effective insulation members 12, 16 enable the use of non-metal grill housings such as plastic grill housings formed from bulk molding compounds, sheet molding compounds, or fiber reinforced plastics. In the 300–350° F. operating range, a preferred grill housing is formed of fiberglass reinforced polyester molded to the desired grill shape to form not only housing 11 and lid 15, but the remaining portions of the entire grill assembly including the base 18, pedestal tank housing 17, and the upper housing portion 21. In this aspect, when the appropriate multi layer metal sheet and foil insulation/reflector members are used, those insulation/reflector members can be co-molded into the plastic housing, such as disclosed in co-pending application, U.S. Ser. No. 08/927,969, filed Sep. 11, 1997, the disclosure of which is incorporated herein.

As an example of a preferred embodiment of the portable gas grill according to the present invention, the following example is given. The base 18 can be approximately 12 in. by 18 in. with the pedestal 17 having a sufficient sized interior opening and sufficient height to contain a conventional camping gas bottle or cannister, such as the Coleman (trademark) one-pound camping propane bottle approximately 4½ in. in diameter and approximately 8 in. in height. The grill housing 11 and lid 15 are sized approximately 12 in. by 15 in. in order to provide a grill surface 13 of approximately 180 sq.in. The interior height of the grilling cavity from the surface of the lower insulation element 12 to the surface of the upper insulation element 16 is about 8 in. with the grill surface 13 positioned approximately 4 in. from the bottom and from the top. Heating element 14 comprises a stainless steel radiant heating tube 36 which is 1 in. in diameter, 9 in. long with end 39 closed. The radiant heating tube 36 contains 8 holes 38 about ½ in. in diameter in the bottom of the tube 36. The radiant heating tube 36 is positioned approximately 1¾ in. below the grill surface 13. The grill surface 13 is preferably a conventional, welded stainless steel wire such as ⅛ or 3/16 in. diameter wire or can be a porcelain-coated steel wire grill.

According to this example, the external housing 11 and the lid 15 are formed from fiberglass reinforced polyester bulk molding compound with separate insulation liner inserts 12 and 16 which are formed to fit from three embossed layers of 2 mils aluminum foil and one layer of 10 mils aluminum sheet where the 10 mils sheet faces the interior of the grill space and the grill surface 13 (1 mill= 0.001 in.). Another preferred embodiment for the insulation elements 12, 16 is (in mils) 10/2/2/5. The insulation members 12, 16 are preferably removable and replaceable. The lid 15 preferably contains a top vent and can also contain a perimeter vent. Particularly preferred is an embodiment including a vent in the rear of the grill housing in the area of the hinge for the lid 15, thus exhausting the combustion gases and grill smoke away from the front of the grill unit. The pedestal and the tank cover 21 are also molded from the bulk molding compound or fiber reinforced plastic and are formed to provide air intake vents for combustion air to feed into the combustion air inlet 33 for the jet burner 31. Additional air vents can be designed into the housing 11 or the interface between the housing 11 and the pedestal 17 when desired. However, since a majority of the heating in the preferred portable gas grill according to this invention occurs from radiant heating rather than convection heating, it will be preferred to keep the convection currents through the interior of the grill while the lid 15 is closed, to a minimum in order to conserve and maximize the effect of the radiant heating from the radiant heater 14.

The grease drippings trap 19 is constructed of sufficient depth so that it does not have to be emptied after each use of the grill and so that the grill can be moved or transported in its normal, upright position without the grease trap spilling contents. The grease trap 19 is configured to be slidably removed from underneath the housing 11 for emptying and cleaning or for disposal if a disposable trap is used.

Figure 4A:
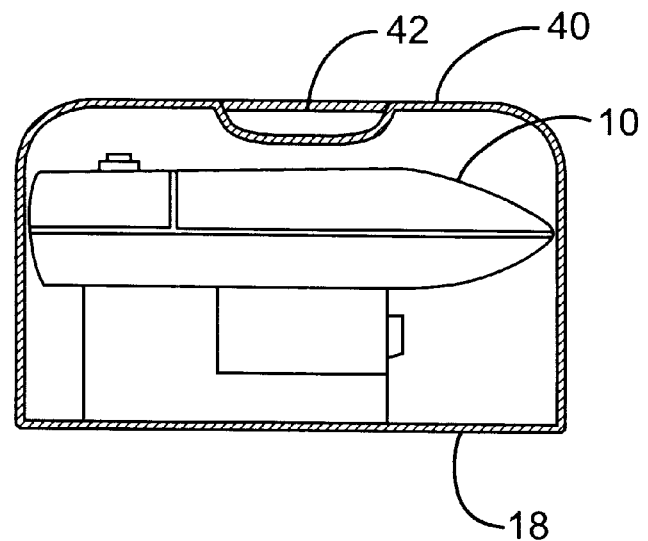
FIGS. 4a and 4b illustrate the use of the cover for the grill as a carrying case or a support table for the grill.
Figure 4B:
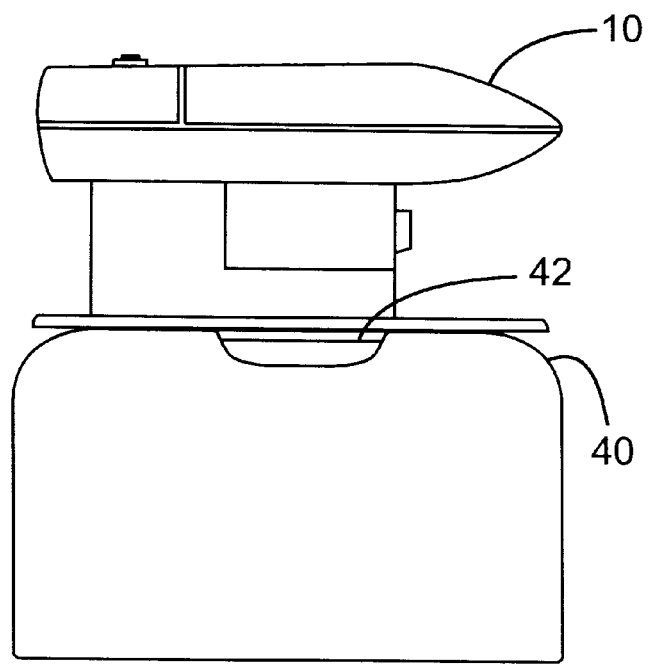

Another aspect of the invention disclosed herein is illustrated in FIGS. 4A and 4B. In this aspect, the portable gas grill 10 further comprises a hard or rigid case 40 which can fit down over the portable gas grill when the lid 15 is closed. The cover 40 contains a handle 42 for carrying the assembled case and grill when the case 40 is attached to the portable gas grill preferably by attachment of the case 40 to the base 18. As illustrated in FIG. 4B, when the case 41 is removed from the portable gas grill 10 the case may serve as a support or table-like support for the portable gas grill 10. This utilization of a hard case or cover 41 is particularly desirable when an appropriate outdoor table or tailgate is not available or when it is preferred not to place the portable gas grill on the tailgate. When the case 40 serves as a support, the grill 10 may be secured to the case by receiving the base 18 in a recess, or by other securing or locking members.

Due to the quick heat-up and quick cool-down of the portable gas grill of this invention, it is ideal for quick use at sporting events or otherwise. In the configuration described above, the gas grill will heat-up to about 700° F. with the lid 15 closed in about five minutes and is ready for cooking. Similarly, from the time the gas is turned off with the lid 15 left open, the grill of this invention will cool-down to a temperature where it can be safely handled, especially with the hard cover 40, in about five minutes.

What is claimed is:

1. A portable gas grill comprising:

a grill housing including a base and a cover;

a grilling surface positioned within the housing;

a radiant heating element within the grill housing for heating food on the grilling surface by radiant heating, the radiant heating element including a gas jet, wherein the grill housing accommodates a one pound propane bottle in an upright position for delivering gas to the gas jet; and a multilayer metal insulation and reflector element within the grill housing for reflecting radiant heat from the radiant heating element to the grilling surface.

2. The portable gas grill of claim 1, wherein the radiant heating element includes a radiant heating tube and the gas jet is arranged to generate a flame which is substantially contained within the radiant heating tube.

3. The portable gas grill of claim 2, wherein the radiant heating tube includes a plurality of openings distributed along the radiant heating tube.

4. The portable gas grill of claim 3, wherein the radiant heating tube is heated by the gas jet to temperatures of at least 1000° F.

5. The portable gas grill of claim 1, wherein heat produced by radiant heating accounts for at least 30% of the total heat produced within the grill housing.

6. The portable gas grill of claim 1, wherein the combination of the radiant heating element and the multilayer metal insulation and reflector element achieve cooking temperatures of at least 700° F. across the grilling surface.

7. The portable gas grill of claim 6, wherein the at least 700° F. cooking temperatures are achieved across a grilling surface of about 170 square inches or greater.

8. The portable gas grill of claim 1, wherein the one pound propane bottle is accommodated in the grill housing base and is completely enclosed by the grill housing base.

9. A cooking device comprising:

a cooking surface;

a radiant heating tube for delivering radiant heat to the cooking surface, the radiant heating tube including a plurality of openings spaced along a lower surface of the tube and no opening along an upper surface and side surfaces of the tube; and a gas burner positioned to generate a flame which is substantially contained within the radiant heating tube.

10. The cooking device of claim 9, wherein the radiant heating tube has a first end containing the gas burner and a second end which is closed.

11. The cooking device of claim 9, wherein the radiant heating tube has a first end containing the gas burner and a second end which is opened.

12. The cooking device of claim 9, wherein the heat produced by radiant heating from the radiant heating tube accounts for at least 30% of the total heat produced by the cooking device.

13. The cooking device of claim 9, wherein the gas burner includes a central gas jet and an air inlet concentrically surrounding the gas jet.

14. The cooking device of claim 9, wherein the radiant heating tube is formed of a material capable of withstanding temperatures up to at least 1000° F.

15. A portable gas grill comprising:

a grill housing including a base and a cover;

a grilling surface positioned within the housing having a grill surface area of about 170 to about 200 square inches;

a gas heating element within the grill housing for heating food on the grilling surface; and gas canister chamber within the grill housing base configured to receive and completely contain a gas canister in an upright orientation.

16. The portable gas grill of claim 15, wherein the gas canister is a two pound or smaller propane bottle.

17. The portable gas grill of claim 15, further comprising a valve configured for connection to the gas canister, the valve controlling delivery of gas to the gas heating element.

18. The portable gas grill of claim 15, wherein the gas canister chamber is configured to receive the gas canister in an upright orientation when the grill housing cover is in an open position and in a closed position.

19. A portable gas grill comprising:

a grill housing including a base and a cover;

a grilling surface positioned within the housing having a grill surface area of about 170 to about 200 square inches;

a gas heating element within the grill housing for heating food on the grilling surface; and gas canister chamber within the grill housing base configured to receive and completely contain a gas canister in an upright orientation; and a grease trap contained within the grill housing and configured to receive grease from the grilling surface and contain the grease during transport.

20. The portable gas grill of claim 19, wherein the grease trap has top, bottom, and side walls and a plurality of openings in the top wall, and the grease trap is removable from the grill housing.

21. A portable grill comprising:

a grill housing including a base and a cover;

a grilling surface positioned within the housing;

a heating element within the base for heating food on the grilling surface;

a grill case configured to fit over the grill housing and secure to the grill housing to fully enclose the grill for transportation, wherein the grill case includes a support surface which receives the grill base and allows the grill case to act as a support for the grill when the grill is in use.

22. The portable grill of claim 21, wherein when the grill case acts as a support for the grill, the grill base is secured to the case by a securing mechanism.

* * * * *